(12) United States Patent
McRobert

(10) Patent No.: US 6,216,635 B1
(45) Date of Patent: Apr. 17, 2001

(54) APPARATUS AND METHOD FOR LIFTING A NET OF AN AQUACULTURE PEN AND AN AQUACULTURE PEN INCORPORATING SAME

(76) Inventor: Ian McRobert, 24 Celosia Way, Ferndale, West Australia 6148 (AU)

( * ) Notice: Subject to any disclaimer, the term of this patent is extended or adjusted under 35 U.S.C. 154(b) by 0 days.

(21) Appl. No.: 09/249,289

(22) Filed: Feb. 11, 1999

(30) Foreign Application Priority Data

Feb. 11, 1998 (AU) .................................................. 1783/98

(51) Int. Cl.$^7$ ............................ A01K 63/00; A01K 71/00
(52) U.S. Cl. ........................ 119/201; 119/203; 119/208; 119/223
(58) Field of Search .................................. 119/201, 203, 119/208, 221, 223, 228

(56) References Cited

U.S. PATENT DOCUMENTS

| | | | |
|---|---|---|---|
| 4,244,323 | * 1/1981 | Morimura | 119/223 |
| 4,257,350 | * 3/1981 | Streichenberger | 119/223 |
| 4,747,369 | 5/1988 | Gotmalm . | |
| 4,890,413 | * 1/1990 | Nelson et al. | 43/55 |
| 4,915,059 | * 4/1990 | Long | 119/224 |
| 5,299,530 | * 4/1994 | Mukadam et al. | 119/223 |
| 5,845,602 | * 12/1998 | Kaarstad et al. | 119/223 |
| 5,967,086 | * 10/1999 | Knott, Sr. | 119/223 |

FOREIGN PATENT DOCUMENTS

| | | |
|---|---|---|
| 79 857/82 | 1/1981 | (AU) . |
| WO85/00726 | 2/1985 | (WO) . |
| WO86/07524 | 12/1986 | (WO) . |
| WO87/04319 | 7/1987 | (WO) . |
| WO87/04320 | 7/1987 | (WO) . |
| WO91/15115 | 10/1991 | (WO) . |

* cited by examiner

Primary Examiner—Peter M. Poon
Assistant Examiner—Yvonne R. Abbott
(74) Attorney, Agent, or Firm—Sheridan Ross P.C.

(57) ABSTRACT

Aquaculture pen 10 includes a frame 12 suspending a net 14. The frame 12 is sufficiently buoyant to suspend the net 14 without sinking below the level of the water in which it floats. The net 14 is formed with a cylindrical side wall 14 and a bottom submerged wall 18 that closes the side wall 16 at an end opposite the frame 12. The pen 10 includes a lifting system 20 for selectively reducing the volume of the pen 10. The lifting system 20 has an annular ring shaped body 22 with the profile of an inverted U located below the bottom wall 18 the body 22 and can be supplied with air via a hose 24 and manifold 26. When air is pumped into the body 22, it causes it to rise. As it rises, the body 22 lifts a part of the bottom wall 18 beneath which it is located to effectively reduce the volume of the pen 10. By centering the body 22 within the pen 10, a channel or race 42 is created between the frame 12 and the ring 22. This allows the efficient herding and/or capture of the marine animals. A collection pan 58 is located below the pen 10 for collecting faeces and other waste materials. This can then be transferred to a separate vessel (eg a boat) by use of a suction hose.

15 Claims, 4 Drawing Sheets

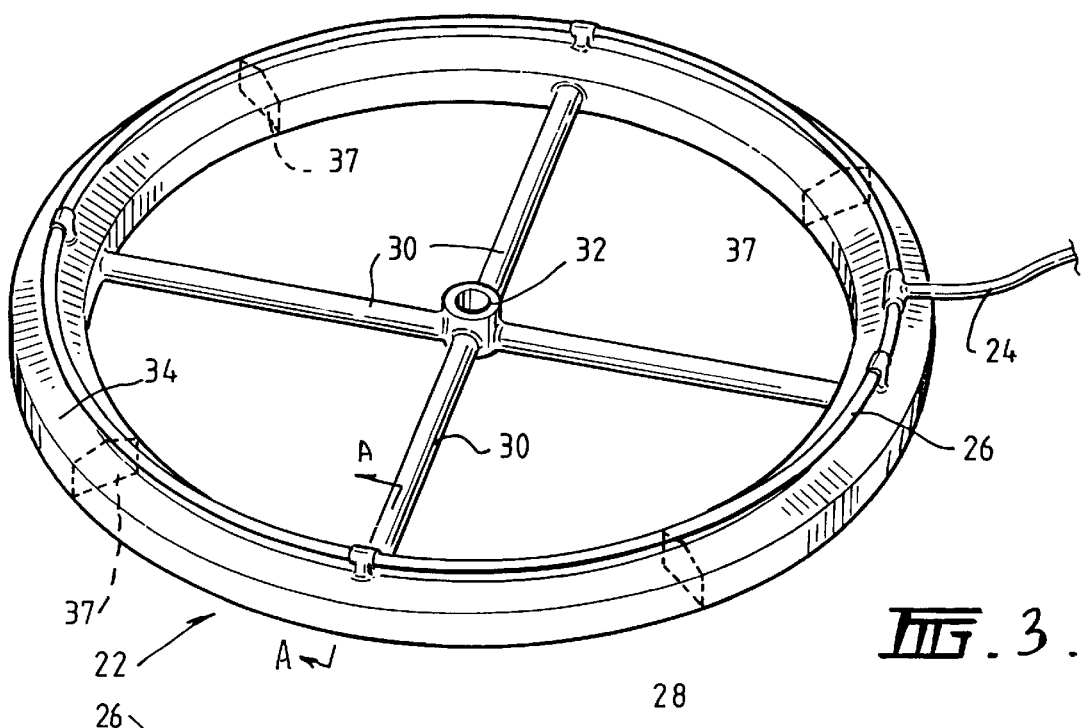
FIG. 3.
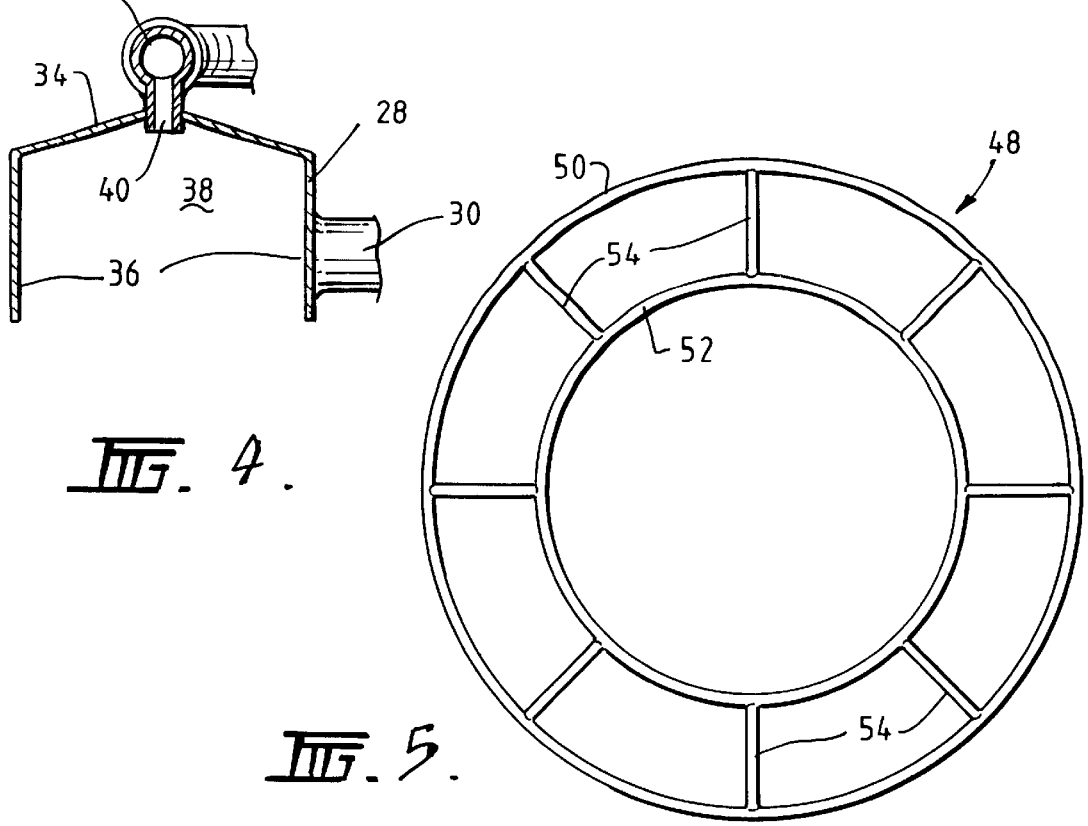
FIG. 4.
FIG. 5.

APPARATUS AND METHOD FOR LIFTING A NET OF AN AQUACULTURE PEN AND AN AQUACULTURE PEN INCORPORATING SAME

FIELD OF THE INVENTION

The present invention is for an apparatus and method for lifting a net of an aquaculture pen and, to an aquaculture pen incorporating said lifting apparatus and method.

BACKGROUND OF THE INVENTION

Aqulaculture pens are used for the farming of marine animals in natural bodies of water such as scas or rivers. Aquaculture pens typically comprise a floating frame from which a net is suspended, the net defining or forming an enclosure for confining the marine animals to be fanned. The size of the pens can vary considerably but pens having a diameter of 40–50 meters are not uncommon. The pens are anchored in a sea or river so that the marine animals are harvested in an environment similar to that in which they would normally live. Typically the pens are attended to every day for the purposes of feeding and animal husbandry. The current method for harvesting or examining the marine animals held within the pen is archaic, labour intensive and expensive. A typical scenario for harvesting marine animals is for a team of two or three divers to dive into the pen and physically herd the marine animals into each other so that they can be grabbed by hand. Indeed, commonly, when the marine animals are fish, they are physically grabbed by the gills by the divers and then acted upon as necessary.

It is also known to place a pen adjacent the pen holding the animals and for the divers to cut the nets of both pens, stitch them together, and then herd a predetermined number or otherwise selected group of animals into the second pen and then separate and restitch the pens. This may be done to separate animals of different size or other different characteristics.

It will be appreciated that because of the large volume of water bound by the pens the above described method of harvesting and otherwise handling the marine animals is extremely inefficient, labour intensive and expensive.

It is also known that due to the fragile psyche of marine animals, a significant percentage often die through trauma when being harvested in the above mentioned manner. Current estimates are that up to 5% of the marine animals may die due to stress when harvested or handled in this manner.

Hitherto, it had also been thought that the above type of aquaculture pen had little deleterious effect on the environment. It was believed that the natural sea currents and wave motion would clear away the waste products front the pens, which includes the faeces of the animals and uneaten food. However this does not always occur. It is known that storms can cause waste products on the sea bottom to pass through a pen poisoning the captive marine animals. Studies have revealed that the waste products by and large settle beneath the pens on the sea bed have the effect of; killing natural sea grasses; promoting the growth of selected species of marine animals over others to effect the overall ecological balance; and, potentially acting as a poison for the, marine animals held within the pens.

SUMMARY OF THE INVENTION

The present invention was developed to attempt to address and alleviate at least some of the above described problems in the use of current aquaculture pens.

According to a first aspect of the present invention there is provided a lifting system for reducing the volume of an aquaculture pen disposable in a body of water, the pen comprising a frame for suspending a net, the net having a side wall and a bottom submerged wall, the volume of the pen being defined by an inside surface of the net and the surface of the body of water and being at a maximum when the net is freely suspended by the frame, the lifting system including:

a lifting agency for providing a lifting force; and a coupling member for supporting or connecting to the bottom wall of the net and coupling to the lifting agency;

whereby, in use, the lifting agency can apply lifting force to the coupling member to raise the coupling member together with the bottom wall thereby reducing the volume of the pen from the maximum volume.

Preferably the coupling member is shaped or otherwise configured to lift a central portion of thc bottom wall to form a channel or race in the pen between the frame and the coupling member when the coupling member is lifted.

Preferably the coupling member is disposed below the bottom wall and is constructed to support the central portion in a plane when lifted by the lifting agency.

Preferably the lifting agency is a gas, and the coupling member is selectively inflatable and deflatable with said gas to control the position of the coupling member and thereby vary the volume of the pen.

Preferably the coupling member includes a body having an open bottom and shaped to trap gas for inflation of the member.

Preferably the body comprises an inverted U channel formed in the shape of an annular ring.

Preferably the system further includes guide means supported by the pen and associated with the coupling member to guide the coupling member as it is raised and lowered.

In one embodiment thc guide means comprises a weight supported by the net and configured to allow the coupling member to pass therethrough.

In an alternate embodiment the guide means passes through and slidably engages with the coupling member.

According to another aspect of the present invention there is provided an aquaculture pen including:

a frame for suspending a net, the net having a side wall and a bottom submerged wall which together with the surface of a body of water in which the pen floats defines a confinement region for a plurality of marine animals, pen; and, lifting system in accordance with the first aspect of the present invention;

whereby, in use, the lifting system can be used to raise the portion of the bottom wall of the net from its lowest submerged position to reduce the volume of the confinement region defined by the net.

Preferably the aquaculture pen further comprises means for collecting waste products from the marine animals held within the pen.

Preferably the collecting means comprises a pan or net of a diameter greater than that of the pen disposed beneath the pen.

Preferably the pen further includes a hollow tubular member which passes through the coupling member and extends to the collection means the tubular member adapted for connection at an upper end to a suction line whereby, waste material gathered on the collection means can be sucked through the tubular member and suction line to a exterior collection vessel.

Preferably said aquaculture pen further comprises means for generating a circular flow of water in the vicinity of the collection means to force waste material within the collection means to gravitate toward the centre thereof and in the vicinity of the tubular member.

According to another aspect of the present invention there is provided a method for selectively reducing the volume of an aquaculture pen of the type disposable in the body of water and comprising a frame and a net suspended by the frame, the net having a side wall and a bottom submerged wall, the volume of the pen being defined by an inside surface of the net and the surface of the body of water, and being at a maximum when the net is freely suspended by the frame, the method comprising the steps of:

provide a lifting agency for providing a lifting force on the net; and providing a coupling member to support or be connected to the bottom wall and for coupling to the lifting agency whereby, in use, the lifting agency can be operated to apply lifting force to the coupling member to lift the bottom wall of the net thereby reducing the volume of the pen from said maximum volume.

Preferably the method further comprises the step of shaping or configuring the coupling member so that when the lifting agency lifts the coupling member a channel or race is formed within the pen between the frame and the coupling member in which marine animals are confined.

Preferably the step of providing a lifting agency comprises providing a supply of gas, to the coupling member to inflate the coupling member to cause it to rise from a lowest rest position.

BRIEF DESCRIPTION OF THE DRAWINGS

An embodiment of the present invention will now be described by way of example only with reference to the accompanying drawings in which:

FIG. 3 is a plan view of an embodiment of a coupling member incorporated in the apparatus and method;

FIG. 4 is a view of section AA of the coupling element shown in FIG. 3;

FIG. 5 is a plan view one embodiment of a guide incorporated in the present apparatus and method;

DETAILED DESCRIPTION OF THE PREFERRED EMBODIMENT

Figure 1:
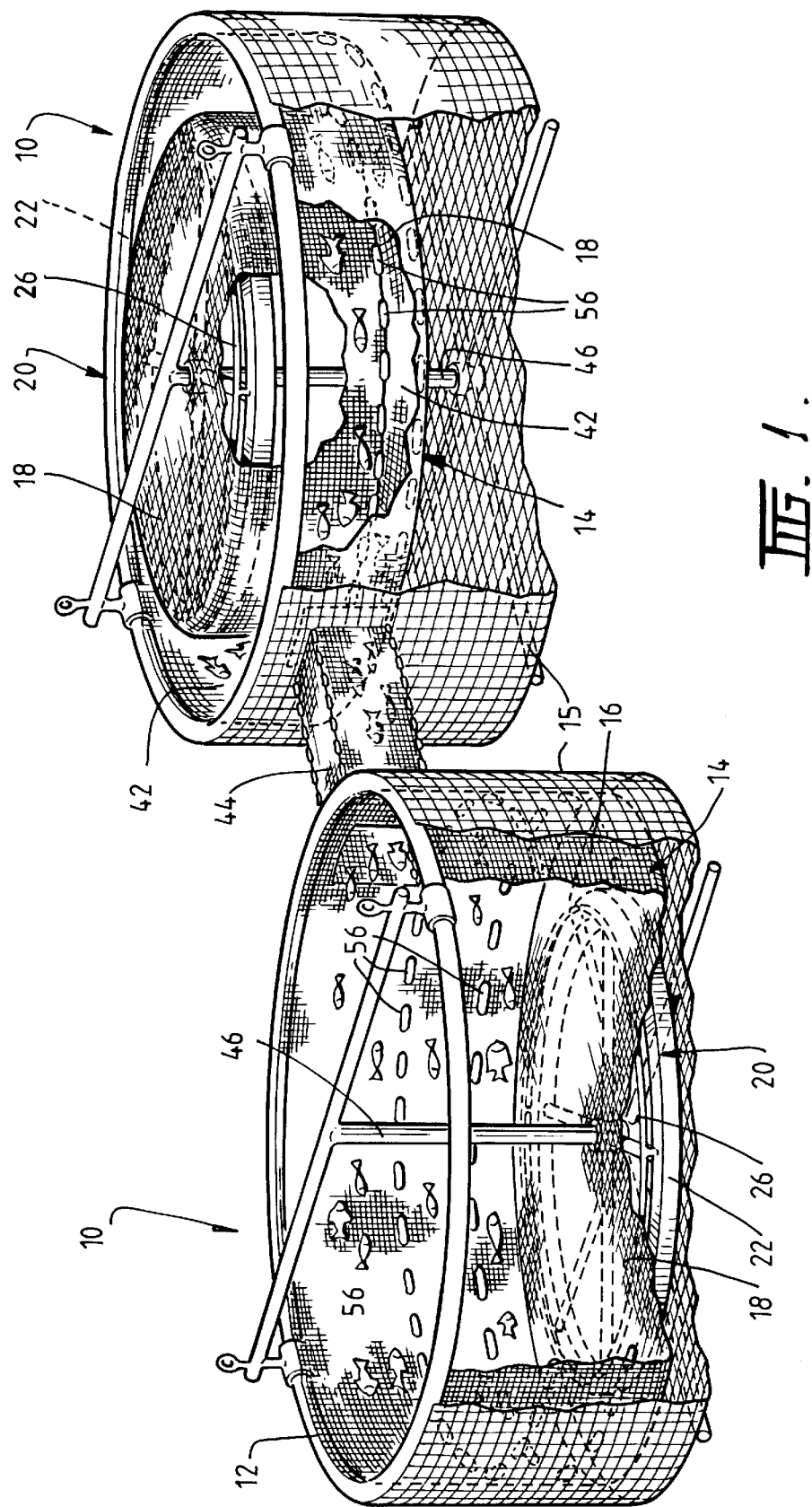
FIG. 1 is a conceptual drawing of two connected aquaculture pens incorporating embodiments of the present method and apparatus for lifting a net of the aquaculture pen.
Figure 2:
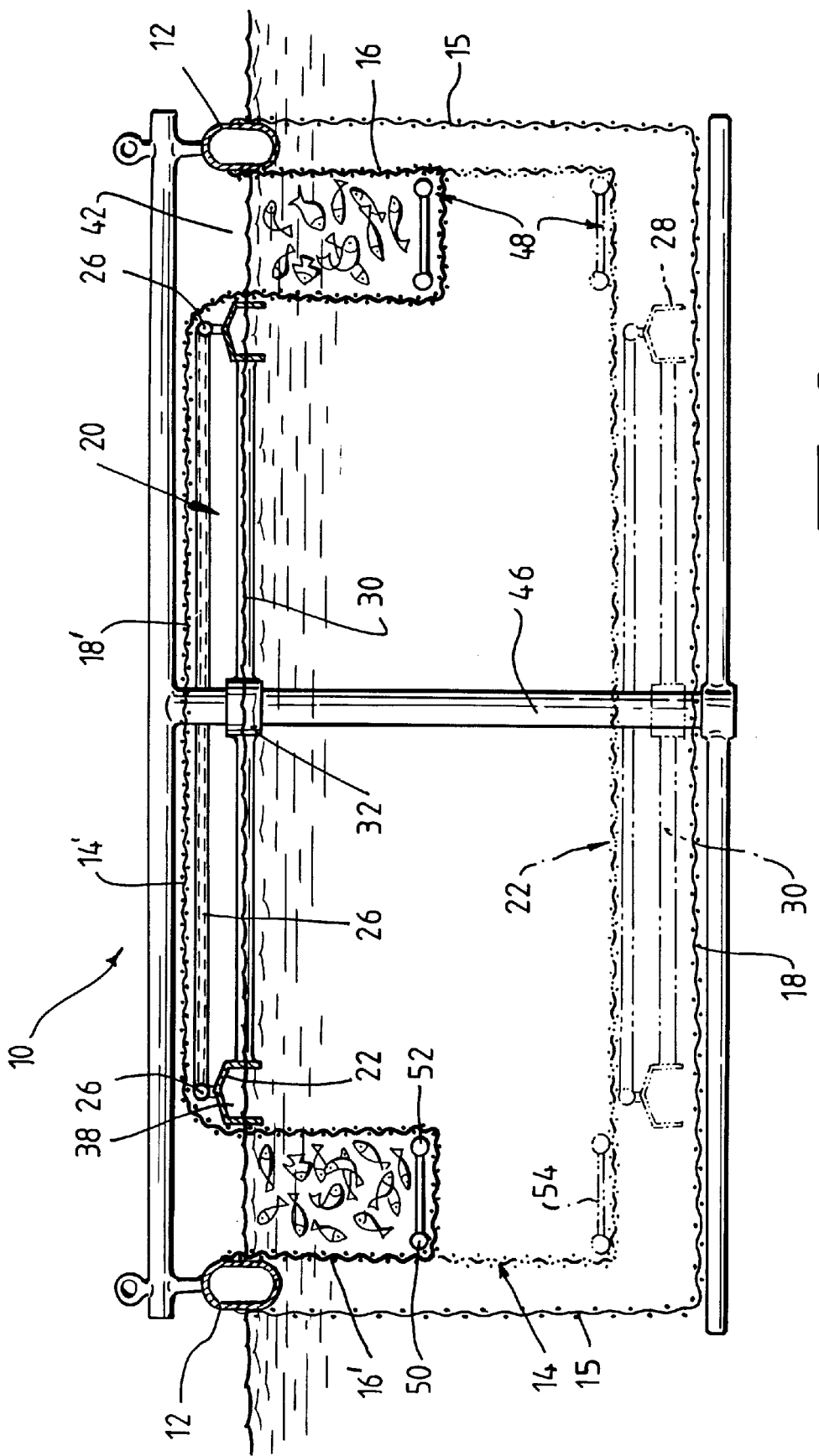
FIG. 2 is a sectional view through an aquaculture pen incorporating an embodiment of the present apparatus and method.

A schematic representation of a typical aquaculture pen in accordance with an embodiment of this invention is shown as item 10 in the accompanying drawings. Referring particularly to FIGS. 1 and 2, it can be seen that the pen 10 includes a frame 12 for suspending a net 14. The frame 12 forms a closed shape such as a circle or square and is either self buoyant or coupled to other buoyant members. The buoyancy of the frame 12 is such that it can suspend the net 14 without itself sinking below the level of the water in which it floats. The net 14 has a side wall 16 which, in this embodiment is a cylindrical sided wall and a bottom submerged wall 18 that closes the side wall 16 at an end opposite the frame 12. Often, the frame 12 will also include a rail system (not shown) which is supported above the level of water and from which the net 12 is suspended. This ensures that an upper part of the net is elevated above the water level to assist in preventing marine animals from escaping the pen 10 or alternately from unwanted marine animals from entering the pen 10.

The effective or useful volume of the pen 10 in which the marine animals confined is defined between the inside surface of the net 14 and the surface of the body of water in which the pen 10 floats. As previously mentioned, an upper part of the side wall 16 may be elevated above the level of the water. Ordinarily, this part of the net would not be used in calculating the volume of the pen. However for the purposes of this invention it is quite irrelevant whether or not this part of the, net is used in calculating the volume. All that is required is consistency.

The volume, of the pen 10 is at a maximum when the net 14 is freely suspended so that the bottom wall 18 is in its lowest possible position. Embodiments of the present invention can effectively reduce the maximum volume of a pen 10 to significantly assist in the harvesting and husbandry of the marine animals held within the pen 10.

In the embodiment shown in FIG. 1, a lifting system 20 is incorporated into the pen 10 to selectively reduce the volume of the pen 10. The lifting system 20 comprise,; a coupling member in the form of an annular ring shaped body 22 which is located below the bottom wall 18 so that it can support the bottom wall 18. A lifting agency provides lifting force, to the annular ring shaped body 22 so that as it is raised, it also raises with it the bottom wall 18 or at least a portion of the bottom wall 18 to effectively reduce the volume of the pen 10. The preferred lifting agency is gas, and more particularly air which can be provided by at blower or compressor on a vessel used to tend the pen 10, the air being supplied to the annular ring 22 via a hose 24 and associated manifold 26. Thus, the annular ring 22 is selectively inflatable and deflatable to control its position and thus the volume of the pen 10.

As shown most clearly in FIGS. 3 and 4, the annular ring 22 is in the form of a wheel having an outer rim 28 and a plurality of radially extending spokes 30 which, at their radially inner end meet at a central collar 32. Thus, the collar 32 is located at the national point of intersection of the spokes 30.

The rim 28 is in the form of an inverted U shape channel having an upper wall 34 and downwardly depending walls 36 along opposite edges. The wall 34 is slightly raised mid width as shown in FIG. 4 to assist in centralising the buoyancy of the ring 22. The walls 34 and 36 and internal diving walls 37 define an separate inflatable zones 38 which can trap air or other gases to provide buoyancy to the annular ring 22 and thus cause it to rise from its lowest position to the surface of the water. The manifold 26 feeds into openings 40 formed in the upper wall 34 to provide a fluid communication with the inflatable zones 38. By pumping air or another gas through the hose 24 and manifold 26, the air inflates the inflatable zones 38 and is trapped beneath the annular ring 22 causing it to rise. The provision of manifold 26, openings 40 and separate zones 38 together with shaping of upper wall 34 assists in maintaining the ring 22 in a substantially planar disposition when being inflated.

Referring to FIG. 1, the pen 10 on the left hand side incorporates a lifting system 20 but with the annular ring 22 in a non inflated state and in its lowest position beneath the bottom wall 18 which in turn is in its freely suspended position. In the pen 10 on the right hand side in FIG. 1., the annular ring 22 has been lifted by inflation with air causing it to rise to the surface level of the water. As this occurs, it brings with it a portion of the bottom wall 18 and in doing so reduces the volume of the pen 10 and also creates a channel or race 42 between the frame 12 and the ring 22 in which the marine animals are confined. It will be appreciated that the width of the race is dependant upon the width of the annular ring 22. Additionally, the shape of the race is also depended upon the shape of the annular ring 22. In this embodiment, the annular ring 22 is of an identical shape but smaller size to the frame 20 and, is centrally located within the pen 10. Consequently, the race 42 is an annular race.

In FIG. 2 the net 14 in its freely suspended state is shown by a solid line, and in its lifted or raised state is shown by the phantom lines, 14',16',18'. FIG. 2 also shows a predator net 15 located about the net 14. The predator net 15 does not form part of this invention and is a prior art device for protecting the net 14 and the animals confined therein.

In FIG. 1 a tunnel 44 is stitched between the adjacent pens 10 and is provided with a gate (not shown) which can be selectively opened and closed to allow the passage of marine animals from a pen on the right hand side to the pen on the left hand side, Because of the substantial reduction in volume of the pen 10 and the creation of the race 42 it is a simple process for one or two divers to herd selected animals to the tunnel 44 and thus transfer them from pen to pen.

Several different guiding means or systems can be used to guide the annular ring 22 as it is moved between its lowest position (shown in pen 10 on the left hand side in FIG. 1) and its highest position (as shown in pen 10 on the right hand side of FIG. 1). One form of guide means is a vertically disposed shaft 46 (see FIG. 1) which passes through the collar 32 and is supported by the frame 12. The provision of the shaft 46 also entail a minor modification to the bottom wall 18 to allow it to pass therethrough and into the collar 32. The engagement of the shaft 46 with the collar 32 ensures that the ring 22 must rise in a substantially horizontal plane and with a fixed radial spacing from the frame 12.

An alternate means for guiding the annular ring 22 is to provide weights in or on the net 14. One form of weight 48 is shown in FIG. 5 and comprises two concentric rings of metal pipe 50 and 52 joined by radial struts 54. The ring 50 has a diameter approximately the same as the diameter of the bottom wall 18. The inner ring 52 has a diameter slightly greater than the outer diameter of the annular ring 22. The weight 48 is simply placed in the pen 10 to sit on the bottom wall 18. When the annular ring 22 is raised it passes through the inner ring 52 and drags with it the bottom wall 18 and lower sections of the side wall 16. Provided the weight 48 has a uniform weight distribution, it will maintain the annular ring 22 centrally within the pen 10 as it is raised.

A similar effect can be provided by providing one or more rings of weights 56 (refer FIG. 1) in the side walls 18 of the net 14. The rings of weights 56 may be in the form of lengths of chain.

When the guide means is in the form of weight 48 or 56 the spokes 30 and collar 32 on the annular ring 22 are not required as these are used for engaging the shaft 46.

Figure 6:
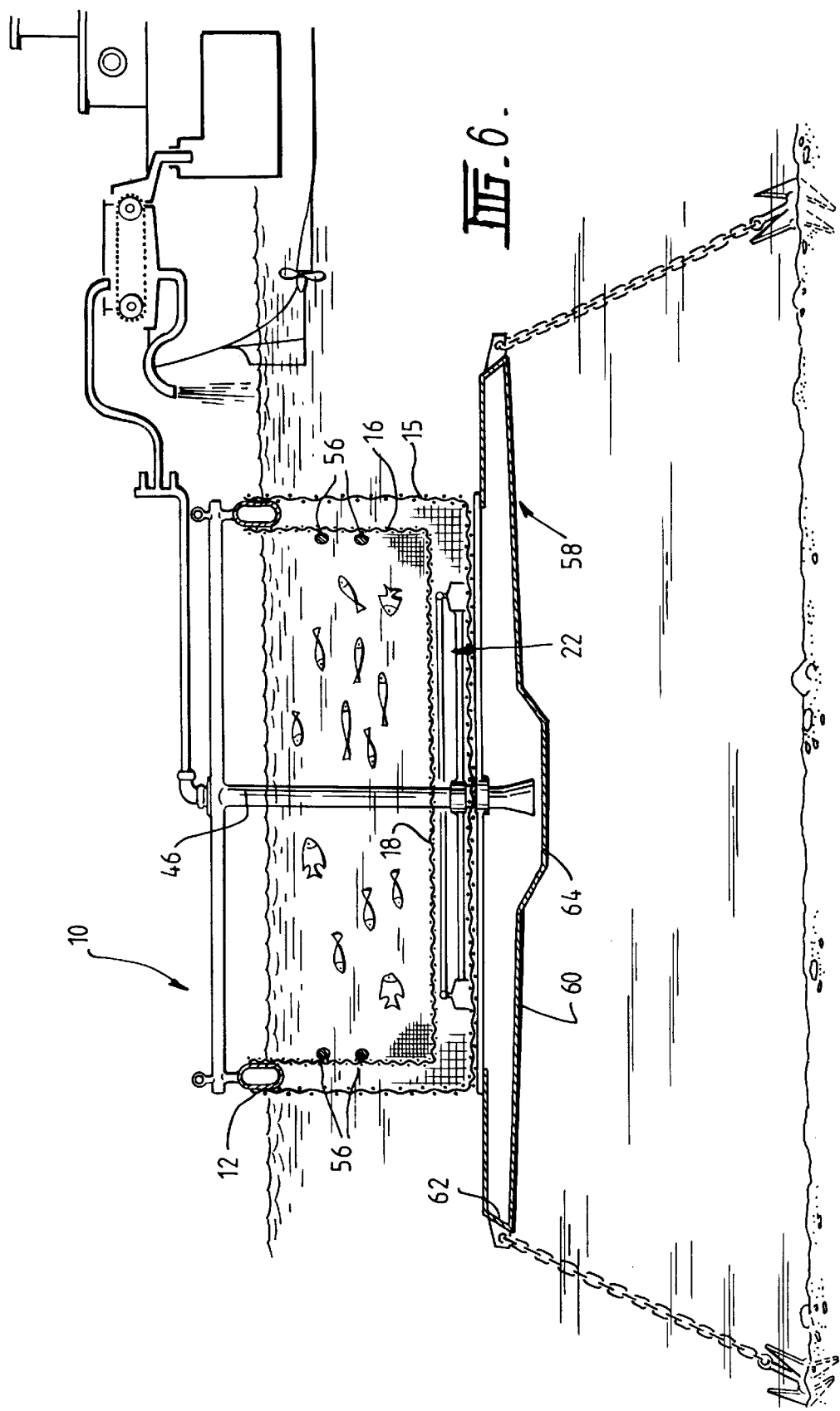
FIG. 6 is a conceptual view of a further embodiment of an aquaculture pen incorporating the present apparatus and method.

In order to limit an adverse environmental effects from the pen 10, a collection means in a form of a pan 58 (refer FIG. 6) can be provided beneath the pen 10 for the collection of waste products. The waste products typically comprise a combination of faeces from the marine animals held within the pen as well as any uneaten food. The pan 58 can be either suspended from the frame 12 or, provided with some buoyancy and anchored to the bottom of the body of water in which the pen 10 floats. The pan 58 would typically have a diameter greater than that of the pen 10. In basic form, the pan 58 would be in the form of a large diameter plate 60 with a shallow upright peripheral wall 62. A central portion of the plate 60 is provided with a depression 64.

A majority of the waste products generated through the use of the pen 10 would eventually settle in the pan 58. When the guide means is in the form of shaft 46, the shaft can be extended so that its lowest end is located within the depression 64. Provided the shaft 46 is hollow, an opposite end of the shaft can be attached to a suction line on a vessel and used to suck out the waste material which can then be transported to land and processed. To assist in the gathering of the waste products a circular flow of water in the region of the pan 58 can be generated. Provided that the waste products are lighter than the water, they will gravitate toward the depression 64 so that they can be sucked up through the shaft 46. The circular flow of water can be generated by one or more submersible pumps supported on the pan 58. The pumps can be solar powered or alternately driven by compressed air which again would be available on the vessel used for tending the pens 10.

In yet a further variation, the annular ring 22 can be lifted by lifting agency other than air such as for example by use of a crane. Typically, a crane would be provided on a vessel used for tending the pens 10.

It would be appreciated from the above description, that embodiments of the present invention allow for the volume of an aquaculture pen 10 to be substantially reduced thereby limiting the area of confinement of the marine animals. This in turn greatly simplifies the procedure for catching or herding the marine animals. The degree of reduction in volume is controlled by the size of the annular ring 22 and the level to which it is raised/lifted. When the ring 22 is lifted a channel or race 42 is formed between the frame 12 and the ring 22 in which the marine animals are confined. Various gates and moveable walls can also be incorporated into the net 14 and pen 10 so as to be operable when the race 42 is created to selectively divert marine animals to different areas within the race or to herd them from one pen 10 to an attached pen. Gates can be formed as square or rectangular flaps of netting attached along one edge to the inside of side wall 16 with a rigid tubular frame extending about the other edges of the flap. The flaps are dimensioned and positioned so that when the ring 22 is lifted to its maximum extent the flaps, when swung across the resulting race 22 can close or segment a part of the race. Simple catches or hooks can be provided to releasably hold the flaps across the race. Indeed, a system of dividing walls and gates can be used in a manner similar to that used for separating sheep in a stockyard. Once the marine animals have been attended to, the ring 22 can be lowered back to a position which maximises the volume of the pen 10 by simply allowing air or gas entrapped within the inflatable zone 38 to escape, Of course, when the lifting agency is a crane, the crane is simply operated to lower the ring 22. Waste material generated by the marine animals within the pen 10 can be largely collected by the pan 58 and transferred to a tending vessel via shaft 46. This substantially reduces any adverse environmental effects caused by the waste products as well as protecting the marine animals 10 from being poisoned by the waste products themselves.

Now that the embodiments of the present invention have been described in detail it will be apparent to those skilled in the relevant arts and numerous modifications and variations may be made without departing from the basic inventive concepts. For example, the shape and configuration of the annular ring 22 can be varied depending on the shape of the pen 10 as well as the desired shape and configuration of the channel 42 to be formed and the desired reduction in volume of the pen 10. Further, the ring 22 is shown as comprising an inverted U shaped rim 28 which defines open bottomed inflation zones 38. However in an alternate form, the inflation zones 38 can be completely enclosed. An open bottom is believed to be the preferred form simply as it requires less material for manufacture. Also, the collar 32 can be dispensed with and the spokes 30 continued so as to meet at a central point and then a hole can be formed through that central point through which the shaft 46 can pass. In addition, the shaft 46 can be used either by itself as a sole guiding means and double as a mechanism by which waste products can be removed; or a shaft 46 can be used in conjunction with the weights 48 and or 56. A variety of various gates. dividing walls and traps can be used an incorporated into the net 12 to further simplify the herding of marine animals. Also the pan 58 can take many different forms such us a sheet of fine netting or sheet of flexible plastics material supported on a frame.

All such modifications and variations, together with others which would be apparent to those of ordinary skill in the art, are deemed to be within the scope of the present invention to be determined from the aforegoing description and the appended claims.

The claims defining the invention are as follows:

1. A lifting system for reducing the volume of an aquaculture pen disposable in a body of water, the pen comprising a frame for suspending a net, the net having a side wall and a bottom submerged wall, the volume of the pen being defined by an inside surface of the net and the surface of the body of water and being at a maximum when the net is freely suspended by the frame, the lifting system including:

a lifting agency for providing a lifting force; and a coupling member for supporting or connecting to the bottom wall of the net and coupling to the lifting agency, said coupling member being shaped or configured to lift a central portion of the bottom wall to form a channel or race in the pen between the frame and the coupling member when the coupling member is lifted; whereby, in use, the lifting agency can apply lifting force to the coupling member to raise the coupling member together with the bottom wall thereby reducing the volume of the pen from the maximum volume.

2. A system according to claim 1 wherein the coupling member is disposed below the bottom wall and is constructed to support the central portion in a plane when lifted by the lifting agency.

3. A system according to claim 2 wherein the lifting agency is a gas, and the coupling member is selectively inflatable and deflatable with said gas to control the position of the coupling member and thereby vary the volume of the pen.

4. A system according to claim 3 wherein the coupling member includes a body having an open bottom and shaped to trap gas for inflation of the member.

5. A system according to claim 4 wherein the body comprises an inverted U channel formed in the shape of an annular ring.

6. A system according to claim 1 further including guide means supported by the pen and associated with the coupling member to guide the coupling member as it is raised and lowered.

7. A system according to claim 6 wherein the guide means comprises a weight supported by the net and configured to allow the coupling member to pass therethrough.

8. A system according to claim 6 wherein the guide means passes through and slidably engages with the coupling member.

9. An aquaculture pen including:

a frame for suspending a net, the net having a side wall and a bottom submerged wall which together with the surface of a body of water in which the pen floats defines a confinement region for a plurality of marine animals; and a lifting system in accordance with claim 1 whereby, in use, the lifting system can be used to raise the portion of the bottom wall of the net from its lowest submerged position to reduce the volume of the confinement region defined by the net.

10. An aquaculture pen according to claim 9 further including means for collecting waste products from the marine animals held within the pen.

11. An aquaculture pen according to claim 10 wherein the collecting means comprises a pan or net of a diameter greater than that of the pen disposed beneath the pen.

12. An aquaculture pen according to claim 11 further including a hollow tubular member which passes through the coupling member and extends to the collection means, the tubular member adapted for connection at an upper end to a suction line, whereby waste material gathered on the collection means can be sucked through the tubular member and suction line to a exterior collection vessel.

13. An aquaculture pen according to claim 12 further including means for generating a circular flow of water in the vicinity of the collection means to force waste material within the collection means to gravitate toward the center thereof and in the vicinity of the tubular member.

14. A method for selectively reducing the volume of an aquaculture pen of the type disposable in a body of water and comprising a frame and a net suspended by the frame, the net having a side wall and a bottom submerged wall, the volume of the pen being defined by an inside surface of the net and the surface of the body of water, and being at a maximum when the net is freely suspended by the frame, the method comprising the steps of:

providing a lifting agency for providing a lifting force on the net;

providing a coupling member to support or be connected to the bottom wall and for coupling to the lifting agency; and shaping or configuring the coupling member so that when the lifting agency lifts the coupling member a channel or race is formed within the pen between the frame and the coupling member in which marine animals are confined whereby, in use, the lifting agency can be operated to apply lifting force to the coupling member to lift the bottom wall of the net thereby reducing the volume of the pen from said maximum volume.

15. A method according to claim 14 wherein the step of providing a lifting agency comprises providing a supply of gas, to the coupling member, to inflate the coupling member to cause it to rise from a lowest rest position.

\* \* \* \* \*